(12) United States Patent
Bandy, IV et al.

(10) Patent No.: US 8,493,699 B2
(45) Date of Patent: Jul. 23, 2013

(54) LOW VISCOSITY ELECTROSTATIC DISCHARGE (ESD) DISSIPATING ADHESIVE

(75) Inventors: William T. Bandy, IV, Fremont, CA (US); Dylan J. Boday, Tucson, AZ (US); Icko E. T. Iben, Santa Clara, CA (US); Wayne A. McKinley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/852,428

(22) Filed: Aug. 6, 2010

(65) Prior Publication Data
US 2012/0033332 A1   Feb. 9, 2012

(51) Int. Cl.
*H02H 3/22*   (2006.01)
(52) U.S. Cl.
USPC ............................................ 361/56; 361/111
(58) Field of Classification Search
USPC .................................................... 361/56, 111
See application file for complete search history.

(56) References Cited

U.S. PATENT DOCUMENTS

| | | | |
|---|---|---|---|
| 6,650,511 B2 | 11/2003 | Hsiao et al. | |
| 6,927,951 B2 | 8/2005 | Huha et al. | |
| 7,223,922 B2 | 5/2007 | Bandy, IV et al. | |
| 7,525,047 B2 | 4/2009 | Iben et al. | |
| 2006/0018070 A1* | 1/2006 | Iben | 361/91.1 |
| 2007/0284133 A1* | 12/2007 | Iben et al. | 174/102 C |
| 2009/0104438 A1 | 4/2009 | Lalli et al. | |
| 2009/0288864 A1 | 11/2009 | Iben et al. | |
| 2009/0289231 A1 | 11/2009 | Bandy, IV et al. | |
| 2009/0290260 A1 | 11/2009 | Bandy, IV et al. | |
| 2009/0290278 A1 | 11/2009 | Iben et al. | |

OTHER PUBLICATIONS

U.S. Appl. No. 13/225,320, filed Sep. 2, 2011.

* cited by examiner

*Primary Examiner* — Danny Nguyen
(74) *Attorney, Agent, or Firm* — Zilka-Kotab, PC

(57) ABSTRACT

In one embodiment, a system includes a cable comprising a plurality of leads and an ESD dissipating adhesive coupled to the plurality of leads in a coverage area for providing ESD protection to an element of an electronic device. The ESD adhesive comprises a mixture of a polymeric thin film and electrically conductive fillers dispersed in the film, and the ESD adhesive has a resistivity from about 50 to 100 MΩ. In another embodiment, a method for providing ESD protection to an element of an electronic device includes applying an ESD adhesive across exposed leads of a cable and evaporating the solvent from the ESD adhesive. At least some of the leads are coupled to an element of an electronic device. The ESD adhesive comprises a polymeric thin film, electrically conductive fillers dispersed in the polymeric thin film, and a solvent for controlling a viscosity of the ESD adhesive.

18 Claims, 13 Drawing Sheets

LOW VISCOSITY ELECTROSTATIC DISCHARGE (ESD) DISSIPATING ADHESIVE

BACKGROUND

The present invention relates to magnetic heads for data storage, and more particularly, this invention relates to adhesives having electrostatic discharge (ESD) dissipating properties for use with magnetic heads.

In magnetic storage systems, data is commonly read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

Magnetoresistive (MR) sensors, such as giant magnetoresistive (GMR), anisotropic magnetoresistive (AMR) and tunnel valve magnetoresistive (TMR) sensors, are used to read data written on magnetic media. MR sensors are used extensively in the hard disk drive (HDD) and tape drive industries. MR sensors are highly sensitive to damage by ESD events. This is a major problem that is encountered during manufacturing, due to handling and use of MR sheet resistors with the build-up of electrostatic charges on the various components of a head or other objects which come into contact with the MR sensors and spontaneously discharge through the MR sensor leading to damage. Static charges may be externally produced and accumulate on instruments used by persons performing head manufacturing or testing function. These static charges may also discharge through the head, causing physical and/or magnetic damage to the sensors.

One method to prevent or minimize ESD damage to MR sensors is via diode protection. Generally, the best location to attach the diodes for maximum protection is as close to the sensors as possible. In tape and HDDs, typically a flexible cable is attached to the MR sensors to allow a connection to external electrical devices. The cabled sensor modules (CMODs) are then assembled into a magnetic head which includes an actuator to move the sensor over the particular data track to be read. The actuation is high frequency, and the response of the actuation is slowed down by extra mass and cable rigidity, urging the use of smaller and smaller cables. In attaching the cables, the spacing between the cable leads can vary along the length of the cable. Furthermore, the spacing of the leads on the cable may change from one product to another. In addition, there are several manufacturing steps required to attach the diode(s) to the MR sensor, thus the possibility still exists for ESD damage to the MR sensor during any of these steps prior to the diode being attached.

Another method to prevent or minimize ESD damage to MR sensors is via conductive coatings. In prior art attempts, these coatings have been applied through screen-printing, rotogravure, and syringe dispensing. They have typically provided good adhesion, but are highly viscous (greater than about 20,000 CP) and therefor are inherently difficult to apply and place with any level of accuracy.

Therefore, a method of protecting magnetic heads and systems during the manufacturing process and during use, that avoids and/or mitigates the problems encountered using other methods, would be very beneficial.

BRIEF SUMMARY

In one embodiment, a system includes a cable comprising a plurality of leads and an electrostatic discharge (ESD) adhesive coupled to the plurality of leads in a coverage area for providing ESD protection to at least one element of an electronic device, wherein the ESD adhesive comprises a mixture of a polymeric thin film and electrically conductive fillers dispersed in the polymeric thin film, wherein the ESD adhesive has a resistivity in a range from about 50 kΩ to about 100 MΩ, and wherein the coverage area is a portion of the plurality of leads where the adhesive is applied.

In another embodiment, a system includes a cable comprising a plurality of leads and an electrostatic discharge (ESD) adhesive operatively coupled to the plurality of leads for providing ESD protection to at least one element of an electronic device, the ESD adhesive comprising a mixture of a polymeric thin film and electrically conductive fillers dispersed in the polymeric thin film, wherein the ESD adhesive has a structural characteristic of being formed through at least partial evaporation of a solvent therefrom.

In another embodiment, a method for providing electrostatic discharge (ESD) protection to an element of an electronic device, the method comprising: applying an ESD adhesive across exposed leads of a cable, and evaporating at least a portion of the solvent from the ESD adhesive, wherein at least some of the leads are coupled to an element of an electronic device. According to this embodiment, the ESD adhesive comprises a polymeric thin film, electrically conductive fillers dispersed in the polymeric thin film, and a solvent for controlling a viscosity of the ESD adhesive.

In yet another embodiment, an electrostatic discharge (ESD) adhesive includes a polymeric thin film, electrically conductive fillers dispersed in the polymeric thin film, and a solvent for controlling viscosity of the ESD adhesive, wherein the ESD adhesive has a resistivity in a range from about 50 kΩ to about 10 MΩ after evaporation of the solvent therefrom, wherein the ESD adhesive has a structural characteristic of being formed through at least partial evaporation of the solvent therefrom, and wherein the ESD adhesive has a viscosity in a range from about 30 CP to about 250 CP prior to evaporation of the solvent therefrom.

Any of these embodiments may be implemented in a magnetic data storage system such as a tape drive system, a hard disk drive, etc., which may include a magnetic head, a drive mechanism for passing a magnetic medium (e.g., recording tape, magnetic disk, etc.) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
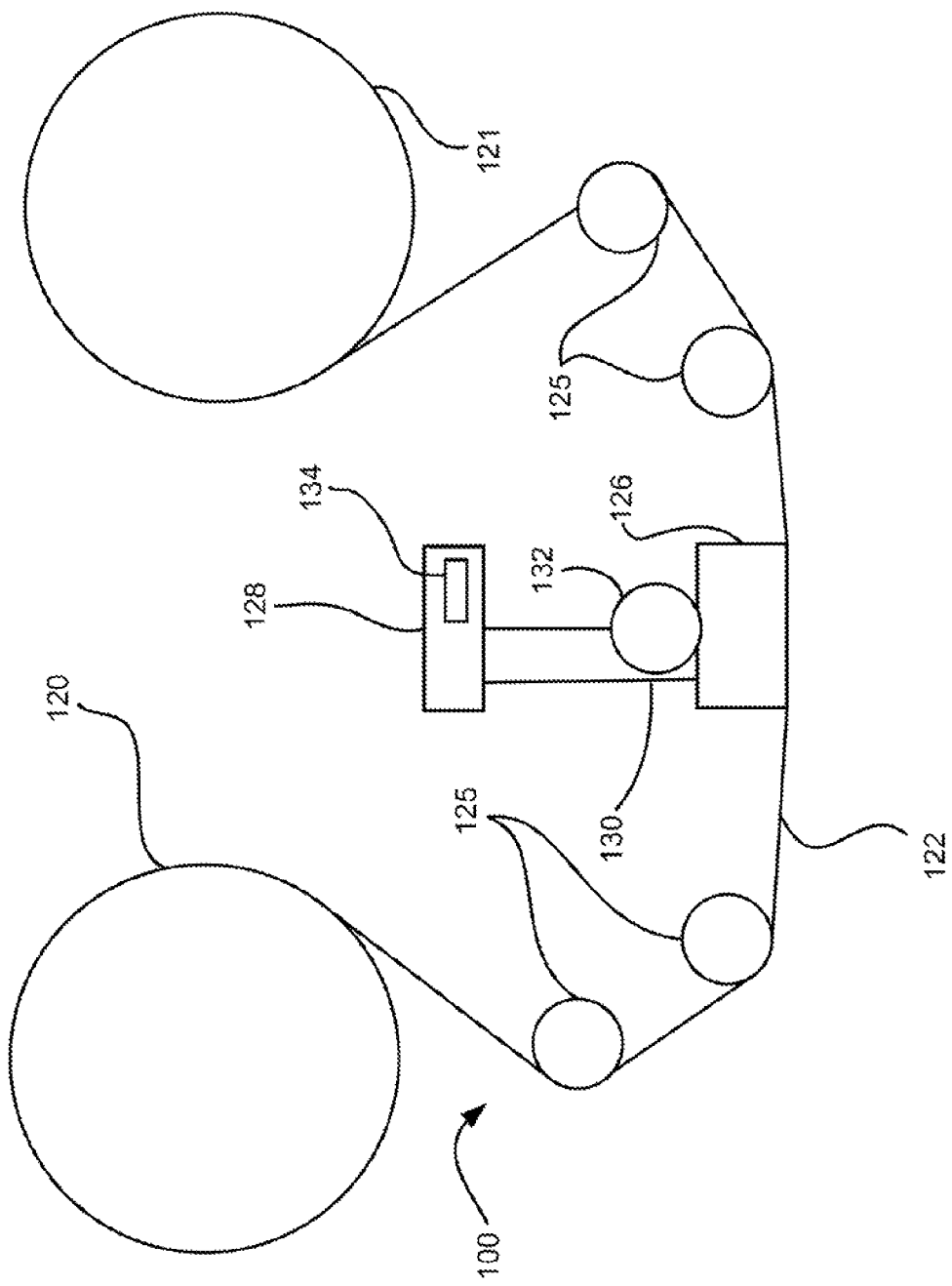
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based and hard disk drive-based storage systems, as well as operation and/or component parts thereof.

In one general embodiment, a system includes a cable comprising a plurality of leads and an electrostatic discharge (ESD) adhesive coupled to the plurality of leads in a coverage area for providing ESD protection to at least one element of an electronic device, wherein the ESD adhesive comprises a mixture of a polymeric thin film and electrically conductive fillers dispersed in the polymeric thin film, wherein the ESD adhesive has a resistivity in a range from about 50 kΩ to about 100 MΩ, and wherein the coverage area is a portion of the plurality of leads where the adhesive is applied.

In another general embodiment, a system includes a cable comprising a plurality of leads and an electrostatic discharge (ESD) adhesive operatively coupled to the plurality of leads for providing ESD protection to at least one element of an electronic device, the ESD adhesive comprising a mixture of a polymeric thin film and electrically conductive fillers dispersed in the polymeric thin film, wherein the ESD adhesive has a structural characteristic of being formed through at least partial evaporation of a solvent therefrom.

In another general embodiment, a method for providing electrostatic discharge (ESD) protection to an element of an electronic device, the method comprising: applying an ESD adhesive across exposed leads of a cable, and evaporating at least a portion of the solvent from the ESD adhesive, wherein at least some of the leads are coupled to an element of an electronic device. According to this general embodiment, the ESD adhesive comprises a polymeric thin film, electrically conductive fillers dispersed in the polymeric thin film, and a solvent for controlling a viscosity of the ESD adhesive.

In yet another general embodiment, an electrostatic discharge (ESD) adhesive includes a polymeric thin film, electrically conductive fillers dispersed in the polymeric thin film, and a solvent for controlling viscosity of the ESD adhesive, wherein the ESD adhesive has a resistivity in a range from about 50 kΩ to about 10 MΩ after evaporation of the solvent therefrom, wherein the ESD adhesive has a structural characteristic of being formed through at least partial evaporation of the solvent therefrom, and wherein the ESD adhesive has a viscosity in a range from about 30 CP to about 250 CP prior to evaporation of the solvent therefrom.

According to one embodiment, a low viscosity electrostatic discharge (ESD) dissipating adhesive, referred to herein as an ESD adhesive, may be added to a location on a cable attached to an MR sensor in a magnetic head where a thin film of the ESD adhesive may be laid over the read/write transducers, thereby providing ESD protection to these elements. According to various embodiments, this ESD adhesive, when applied in an advantageous location, may be used as a standalone ESD protection or may be used in conjunction with diode protection.

Some prior attempts to use adhesives for ESD protection have failed due to the adhesives' viscosity and/or conductivity, which were too high, and thus adequate ESD protection was never achieved.

According to one embodiment, a thin low viscosity film is applied, the film including one or more conductive fillers, over exposed read and/or write transducer leads on the cable. The resulting ESD film having the one or more conductive fillers allows for the dissipation of an ESD, whereby the current is not passed through any MR sensors and no damage to the MR sensors results from the ESD event.

In preferable embodiments, the choice of materials for the ESD adhesive enables a manufacturing process which achieves a desired resistivity for the cable connections (due to geometries and materials of construction) which are not achievable otherwise.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
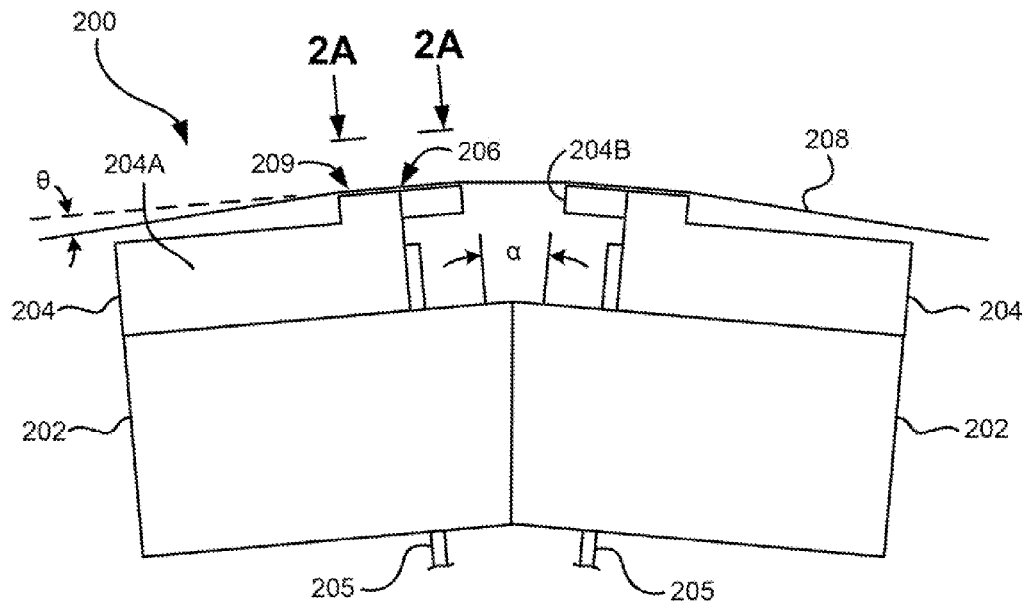
FIG. 2A is a tape bearing surface view taken from Line 2A of FIG. 2.
FIG. 2B is a detailed view taken from Circle 2B of FIG. 2A.
FIG. 2C is a detailed view of a partial tape bearing surface of a pair of modules.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers. Cables 205 couple the readers and/or writers 206 to a controller.

Tape heads with read, write, and servo elements exemplify the concept of an electronic device with multiple elements requiring different diode types. For example, inductive writers do not require diode protection, and attaching diodes across the leads of a writer element will often be deleterious to the writer performance, as the diodes will shunt current away from the writers, decreasing the writer currents for a given applied voltage/current. Often, servo and reader elements operate under different current/voltage (IV) characteristics and thus require different diode designs. Therefore, a single diode chip which is capable of being used with a variety of magnetic head designs and could be wired to the magnetic head in a particular way to avoid negative consequences of attaching diodes across certain elements would be preferable.

Figure 2A:
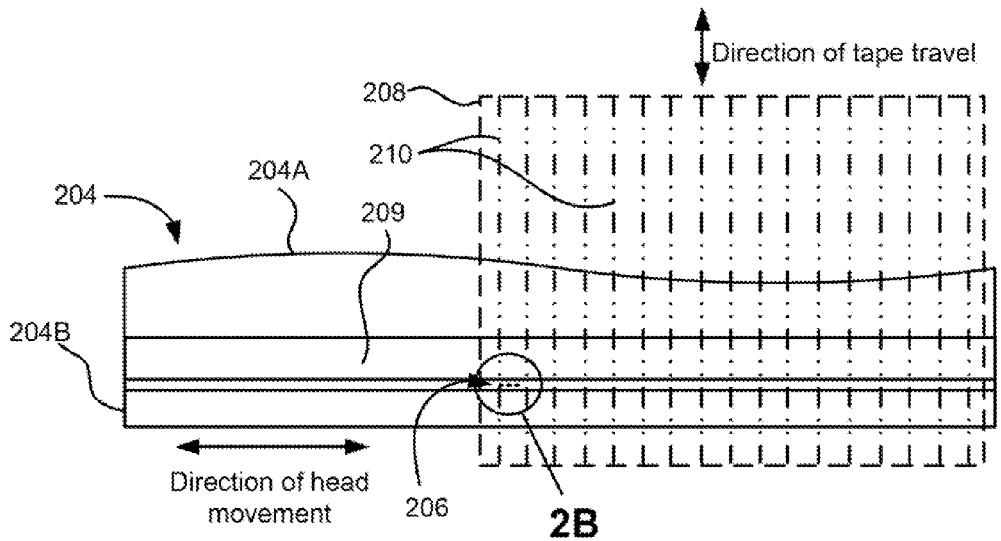

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4-22 data bands, e.g., with 16 data bands and 17 servo tracks 210, as shown in FIG. 2A on an e.g., one-half inch wide tape 208. Current LTO products include 4 data bands and 5 servo tracks. The data bands are defined between servo tracks 210. Each data band may include a number of data tracks, for example 96 data tracks (not shown). During read/write operations, the readers and/or writers 206 are positioned within one of the data bands. Outer readers, sometimes called servo readers, read the servo tracks 210. The servo signals are in turn used to keep the readers and/or writers 206 aligned with a particular track during the read/write operations.

Figure 2B:
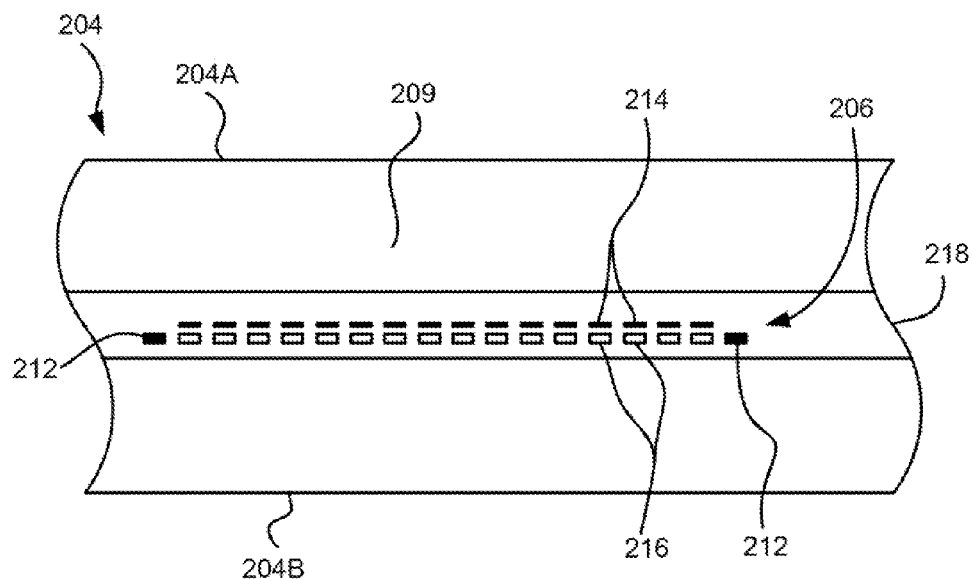

FIG. 2B depicts a plurality of readers and/or servos and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 33, 40, 64, 66, etc. readers and/or writers 206 per array. A preferred embodiment includes 33 readers per array and/or 33 writers per array, 32 of which are used for forward and 32 for reverse tape motion. This allows the tape to travel more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
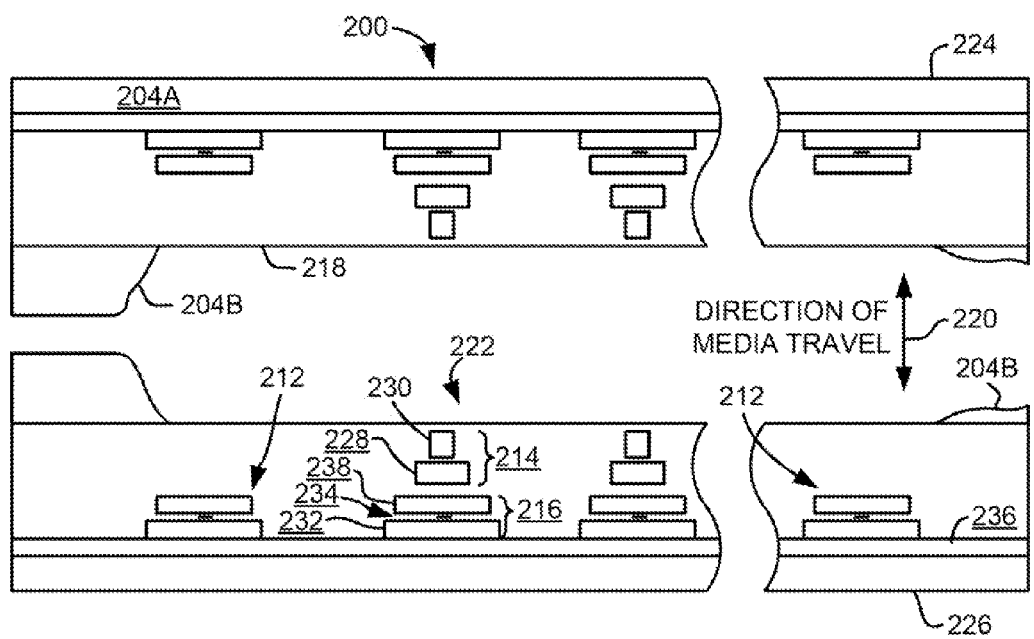

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
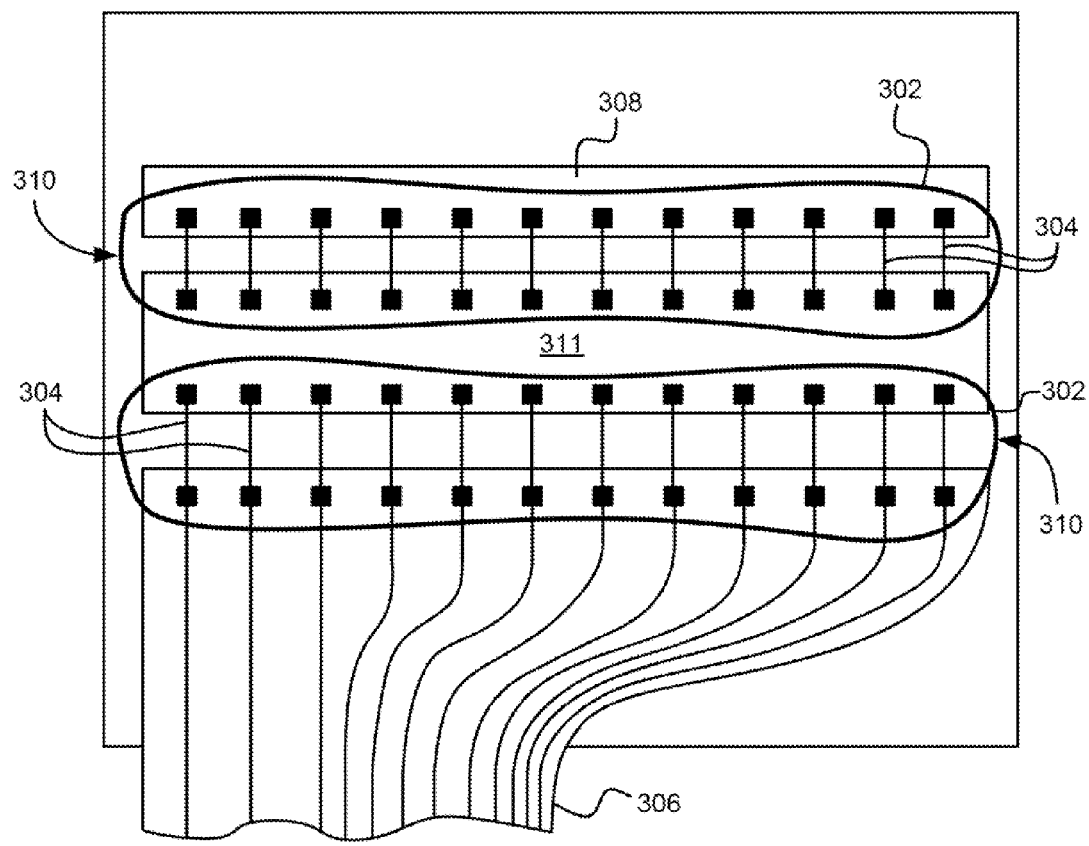
FIG. 3 illustrates an ESD adhesive applied to a cable with contact leads, according to various embodiments.

Now referring to FIG. 3, an ESD adhesive 302 as applied to a magnetic head is shown according to one embodiment. The ESD adhesive 302 is sometimes referred to as a film in this disclosure, as it is not a requirement that the ESD adhesive actually include any adhesive at all. However, it is an adhesive in terms of adhering to the surface to which it is applied. An advantageous location for application of the ESD adhesive 302, according to some approaches, is in a position where read and/or write transducer leads 304 are exposed, and a thin film of ESD adhesive 302 may be laid over these exposed transducer leads 304. Such a location exists where the cable 306 attaches to the printed circuit board 308 of a magnetic head, as shown in FIG. 3. The example in FIG. 3 is from an IBM LTO-5 half height (HH) drive and accompanying cable. However, any cable type may be used, such as full height cables, window cables, etc.

In the prior art, attempts have been made to provide a material which could provide ESD protection to elements of electronic devices that could be applied to leads. However, these prior attempts have all failed due to either the material being too viscous and not providing enough surface area contact with the leads, or the material having too high of a resistivity, thereby not providing ESD protection to elements of the electronic device, since the resistive path through the elements was less than the resistive path through the material.

As can be seen from FIG. 3, the ESD adhesive 302 may be used to provide ESD protection to reader and/or writer transducers of a magnetic head. the distance between exposed read and/or write transducer leads 304 are very small, and prior art adhesives having higher viscosities do not flow adequately in between the leads 304. This inadequate flow of prior art adhesive reduces the amount of surface contact between the exposed lead 304 and the solder joint 310. Additionally, cured epoxies form a skin on exterior surfaces thereof, resulting in a surface that is no longer conductive, which therefore can no longer provide conductive protection to the elements coupled to the leads.

In one preferred approach, an ESD adhesive 302 may include a polymeric thin film, electrically conductive fillers dispersed in the polymeric thin film, and a solvent for controlling viscosity of the ESD adhesive 302. The ESD adhesive 302 may have a resistivity in a range from about 20 kΩ to about 100 MΩ, preferably between about 50 kΩ and about 10 MΩ, and may have a structural characteristic of being formed through at least partial evaporation of the solvent therefrom. Also, the ESD adhesive 302 may have a viscosity in a range from about 10 CP to about 2000 CP prior to evaporation of the solvent therefrom, and more preferably in a range from about 30 CP to about 250 CP prior to evaporation of the solvent therefrom, in some embodiments. A structural characteristic of being formed through at least partial evaporation of the solvent therefrom includes having the ability to flow around the leads of the cable properly to allow for sufficient surface area coverage so as to provide enough contact that the resistivity of the ESD adhesive is not inhibitive of protecting the elements of the electronic device.

According to some embodiments, an ESD adhesive 302 may include a polymeric thin film having conductive fillers therein. The polymeric thin film may be of any type, such as polyurethane, a poly n-vinyl acetate, polyethylene, a step and chain growth polymer, etc., or any other polymeric thin film known to those of skill in the art. The conductive fillers may be of any type, according to various embodiments, such as carbon black, graphite, carbon nanotubes, titanium, silver, silver nanoparticles, gold, gold nanoparticles, platinum, platinum nanoparticles, conductive polymers, combinations thereof, etc., or any other conductive filler known to those of skill in the art. The quantity of conductive fillers incorporated into the polymeric thin film may be selected to provide a desired resistivity of the ESD adhesive 302, according to one embodiment.

According to one preferred embodiment, the viscosity of the ESD adhesive 302 may be reduced via addition of a solvent to the polymeric thin film having conductive fillers therein. Any type of solvent may be used including, preferably, higher buoyancy solvents, in one embodiment. Some exemplary solvents include xylene, toluene, benzene, chlorobenzene, ethyl acetate, thinyl acetate, non-polar organic solvents, mixtures thereof, etc., or any other solvent capable of reducing a viscosity of the ESD adhesive while not inhibiting ESD protection capability of the ESD adhesive.

Preferably, in some embodiments, the solvent may have a boiling point of about 110° C.±20° C., to provide a fairly low vapor pressure and to enable slow evaporation from the polymeric thin film, providing an acceptable homogeneous film coating. Of course, other boiling points are possible, and this value is given as an example. The provided benefits of using a solvent with a boiling point around about 110° C. may be achieved through other methods, as known to those of skill in the art.

In another embodiment, the polymeric thin film may include adhesive materials, thereby providing an adhesive characteristic to the ESD adhesive 302.

In another embodiment, silica particles and/or nanoparticles may be incorporated into the ESD adhesive 302 to increase and/or control the viscosity of the ESD adhesive 302, while simultaneously controlling the resistivity of the ESD adhesive 302.

Figure 9:
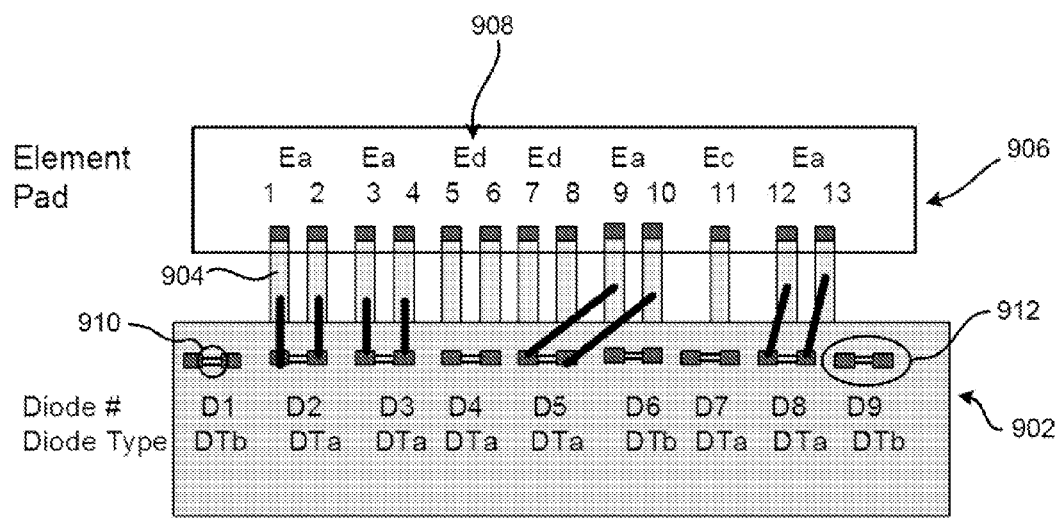
FIG. 9 is a schematic diagram of a multi-diode chip according to one embodiment.

According to one embodiment, as shown in FIG. 9, a multi-diode chip 902 may be coupled to the plurality of leads 904, the multi-diode chip 902 comprising a plurality of crossed diode sets 910, each crossed-diode set 910 operatively coupled across pairs of contact pads 912, wherein a first contact pad of each pair of contact pads 912 is coupled to a cable lead 904 and a second contact pad of each pair of contact pads 912 is coupled to an element 908 of the electronic device 906.

Figure 4A:
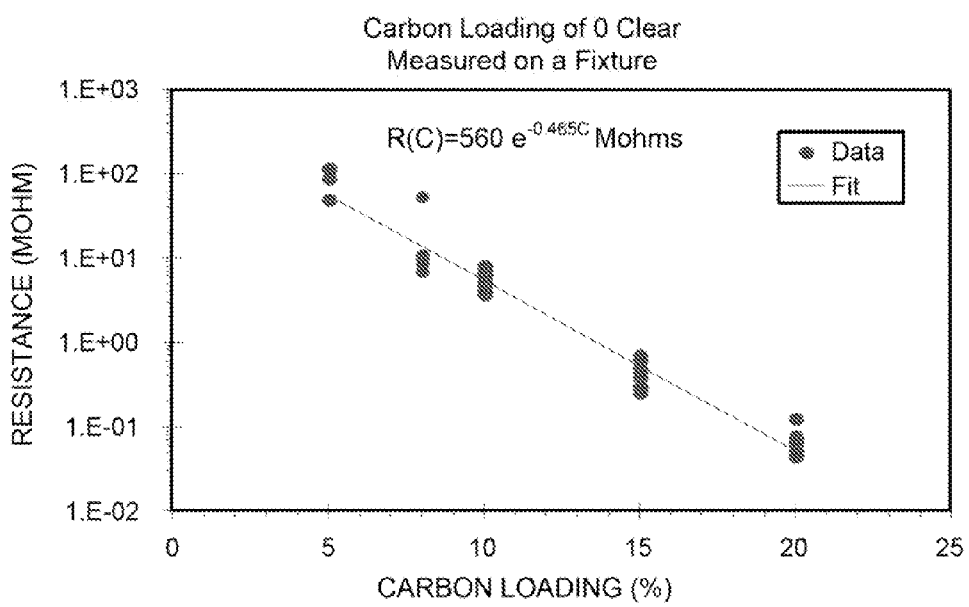
FIG. 4A is a graph showing resistance as a function of carbon loading, according to one embodiment.
Figure 4B:
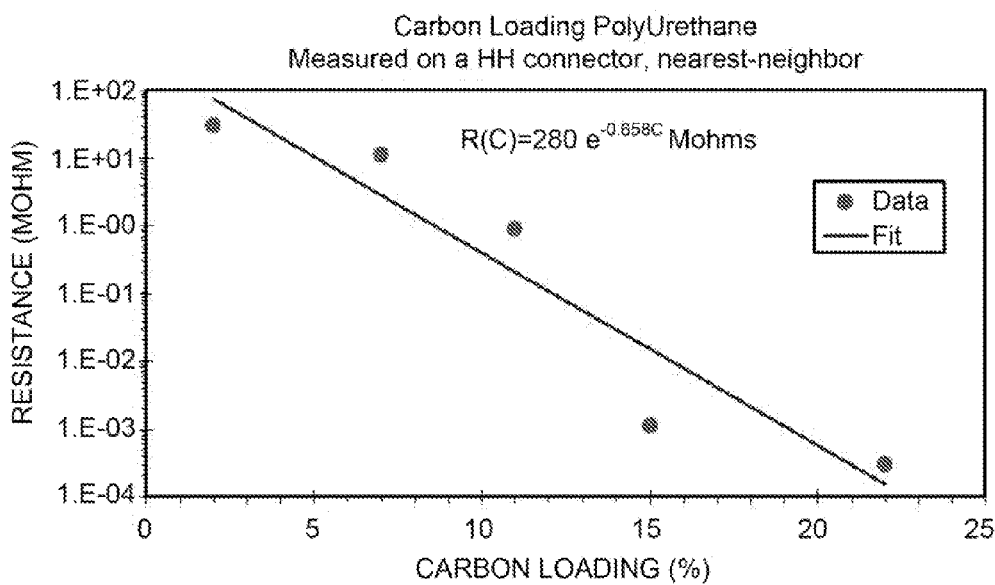
FIG. 4B is a graph showing resistance as a function of carbon loading, according to one embodiment.

In one example, a polyurethane thin film having carbon black therein was used as an ESD adhesive on a cable/magnetic head connection. As shown in FIGS. 4A-4B, a significant difference in the resistance of adhesives was observed for conductive adhesives prepared from epoxies, as shown in FIG. 4A, compared to polyurethane thin films, as shown in FIG. 4B. The resistance drop for conductive adhesives prepared from polyurethanes are significantly lower than epoxies at the same carbon loading wt %. Through this testing, it was found that a concentration of the carbon black incorporated into the polymeric thin film to achieve an acceptable resistivity of the ESD adhesive may range from about 0.1 wt % to about 25 wt %, preferably between about 3 wt % to about 16 wt %, and most preferably from about 11 wt % to about 14 wt %, according to various embodiments.

The choice of the resistance connection between elements using the dissipative connection provided by the ESD adhesive may be determined by two main factors, according to one embodiment: (1) the resistance connection does not interfere with drive performance; and (2) the resistance connection functionally dissipates voltage/charge differences between the elements and the external device. In another embodiment, an additional consideration for the lead-to-lead resistance is a desire to measure the connection during assembly.

Examples of an external device include, but are not limited to: a fixture used in assembly/manufacturing; an electronic tester used to test the device; the final device, herein referred to as a drive, etc.

To ensure that the dissipative connection provided by the ESD adhesive does not interfere with drive performance, one method that may be used may be to set a minimum resistance, in one approach. For tape drives, an acceptable minimum lead-to-lead resistance may be about 50 kΩ, in one approach. Though smaller values may be used, 50 kΩ is a conservative value that may be applied broadly across many platforms. An upper limit for dissipation in a reasonable time may be determined by using an RC time constant and using the capacitance of the device to ground, in one approach. For a floating cable, the capacitance to a tester may be several pF. With a desire to dissipate within about 1 ms, and assuming a 10 pF capacitance to ground, an upper limit in the dissipation resistance may be: 1 ms/10 pF=100 MΩ. Inexpensive ohm meters can measure resistances of the order of several MΩ, so an upper limit of about 10 MΩ to about 20 MΩ would allow one to easily and cheaply test whether the dissipative adhesive connection is formed, in one approach.

An acceptable resistivity of the ESD adhesive may range from about 20 kΩ to about 100 MΩ, more preferably between about 50 kΩ and about 10 MΩ, according to various embodiments. In one embodiment, a resistivity between adjacent leads through the ESD adhesive may be about 50 kΩ or greater, such as about 100 kΩ, about 1 MΩ, about 5 MΩ, etc. The resistivity for this exemplary ESD adhesive was better than the resistivity of carbon-filled epoxies. This is thought to be due to the viscosity of the ESD adhesives, which is lower than that of carbon-filled epoxies.

Figure 10:
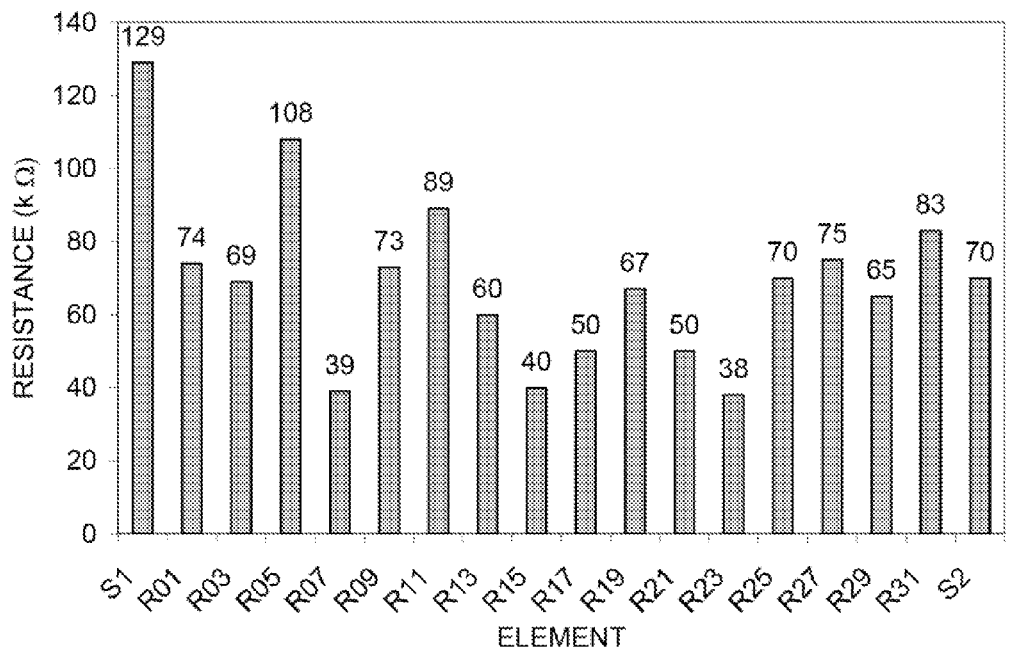
FIG. 10 shows a histogram of lead-to-lead resistance ($R_{nab}$) values for an HH cable using 4.0% carbon in a polyurethane-based ESD adhesive, according to one embodiment.

FIG. 10 is a histogram of the lead-to-lead resistance ($R_{nab}$) and for a G5HH cable using the ESD adhesive having a carbon loading of about 4.0% by weight, in one embodiment. A carbon loading of 4.0% is designed to achieve a nominal lead-to-lead resistance of between about 50 kΩ to 100 kΩ. FIG. 4 plots the cumulative fraction versus $R_{nab}$ for the same part.

Figure 11A:
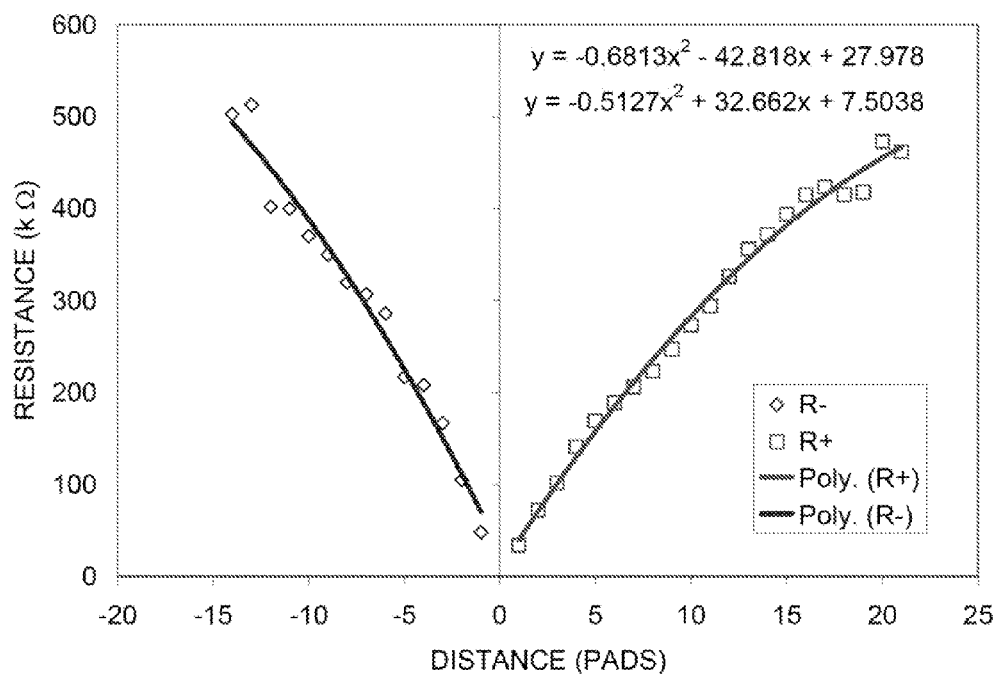
FIGS. 11A-11B show the resistance from R19+ and S1+, respectively, for an HH cable using 4.0% carbon in a polyurethane-based ESD adhesive, according to one embodiment.
Figure 11B:
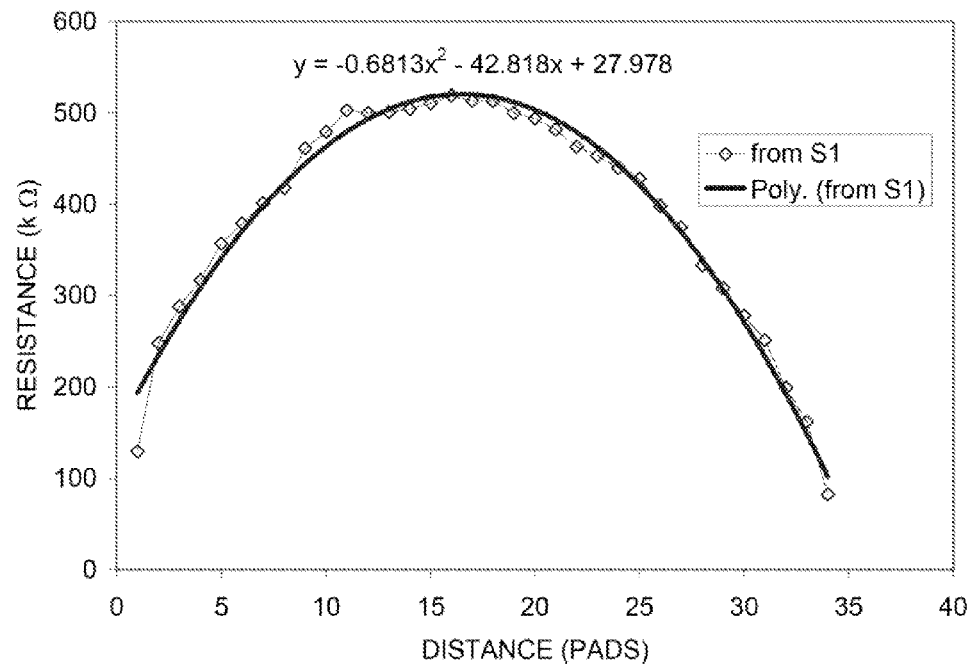

FIG. 11A plots the resistance from reader R19+, with the x-axis being pad spacing, in one embodiment. The resistance increases in a nearly linear manner in either direction, but is best fit with a polynomial curve in either direction. For a serial connection from one pad to the next, such an increase is expected. FIG. 11B plots the resistance from servo S1+, with the x-axis being pad spacing, in one embodiment. The data is best fit with a polynomial with the maxima being at the middle most reader. The reason for this is thought to be because there are two ground traces which are internally connected together and connect to a pad adjacent to either servo. Thus, S1 and S2 are connected to the ground trace by a low impedance of the order of 100 kΩ. Taking the data shown in FIG. 10, and using a design were the average lead-to-lead resistance is about 50 kΩ, the resistance from S1 to S2 may be about 1 MΩ, in one approach. Adding the ground pads which connect to the ESD adhesive significantly decreases the total resistance across the entire connector.

Figure 12:
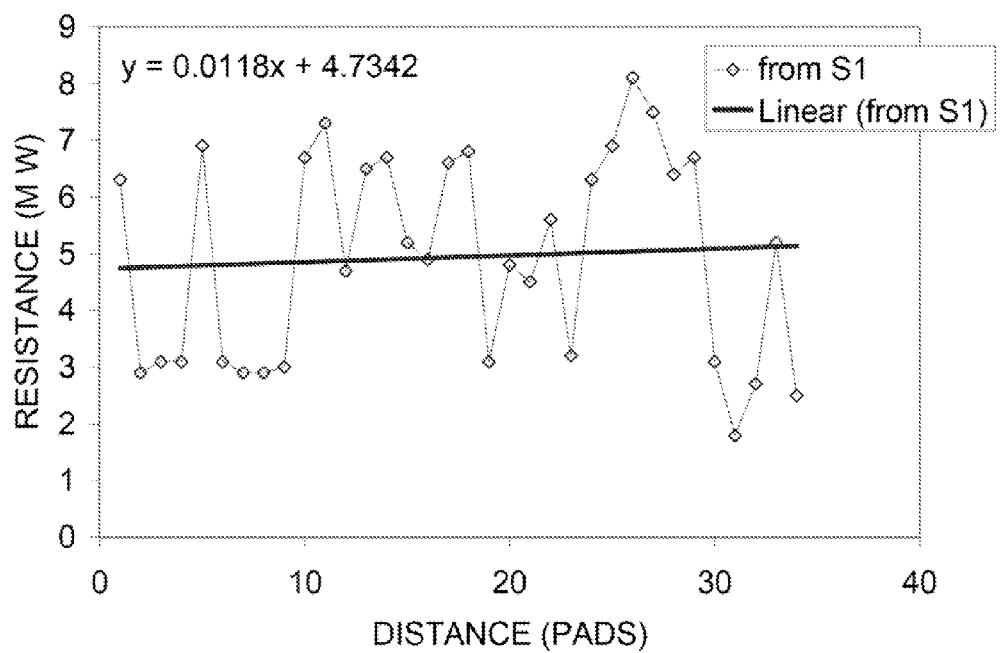
FIG. 12 shows resistance from S1+ for an HH cable with 3.0% carbon in a polyurethane-based ESD adhesive, according to one embodiment.

Though the resistance versus distance is fairly linear in the cases shown in FIGS. 10 and 11A-11B, this is not always the case. The resistance values are highly dependent on the geometry of the applied adhesive, as well as the geometry and material of the connectors used. The contact resistance can vary depending on the material of the leads to which the ESD adhesive is attaching. The resistance between different metal leads embedded in the ESD adhesive is often non-linear with distances. When the resistance from one lead to another is in the MΩ or larger regime, and the ESD adhesive covers a region well outside the lead-to-adhesive contact area, the resistance versus distance can be dominated by the contact resistance, showing very little dependence with distance over a rather large range, in one embodiment. This effect is shown in FIG. 12, where the average lead-to-lead resistance is about 4.7 MΩ.

Figure 5:
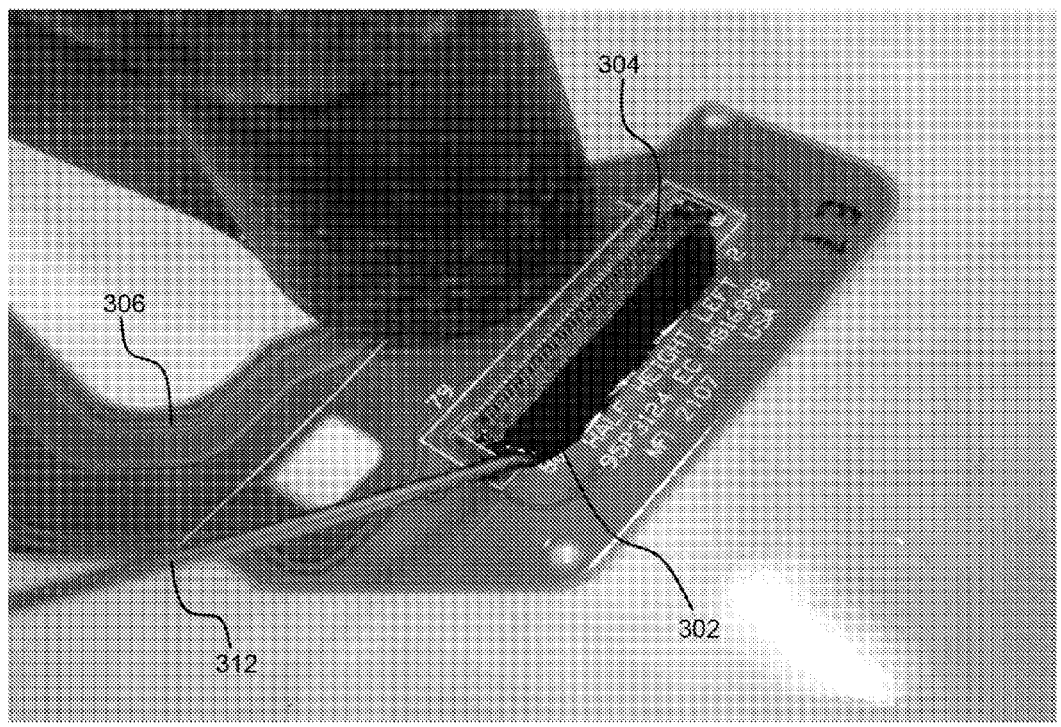
FIG. 5 is an image demonstrating how an ESD adhesive may be applied to a cable, according to one embodiment.

FIG. 5 demonstrates how an ESD adhesive 302 may be applied to a cable 306 where the read and/or write transducer leads 304 are exposed. In this example, the ESD adhesive 302 is applied with a syringe 312, but any application technique as would be known to one of skill in the art may be used. Since syringe application of adhesives is commonly used in magnetic head manufacturing, this application method may be preferred over others, but the invention is not so limited. Other application techniques include painting the ESD adhesive 302 onto the exposed leads 304, auto-dispensing the ESD adhesive 302 onto a portion of the cable 306, using a silk screening process (of a type known in the art) to apply the ESD adhesive 302 to the exposed leads 304, etc.

Figure 6:
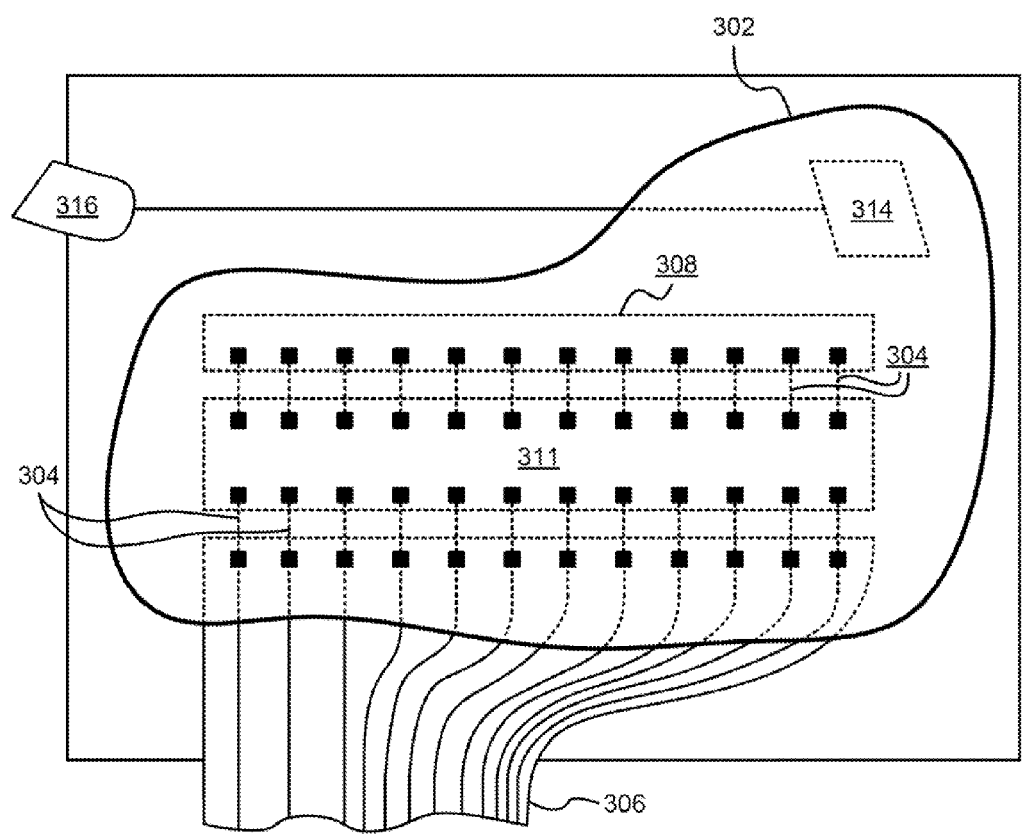
FIG. 6 illustrates an ESD adhesive applied to a modified cable with contact leads, according to one embodiment.

As shown in FIG. 6, to dissipate charge from the ESD adhesive 302, cables which are commonly used in magnetic head manufacturing may be used with only very minor modifications. In one embodiment, a portion of the polyimide film (such as a KAPTON film) may be removed from the cable 306 to expose a stainless steel stiffener 314 beneath. The ESD adhesive 302 may be placed over the exposed stainless steel stiffener 314 allowing charges to be drawn from the ESD adhesive 302 to a ground 316. This application of the ESD adhesive 302 onto the stainless steel stiffener 314 may be performed at the same time that the ESD adhesive 302 is applied to the exposed leads 304, or at any other time during the manufacturing process, as would be known to one of skill in the art.

Figure 7A:
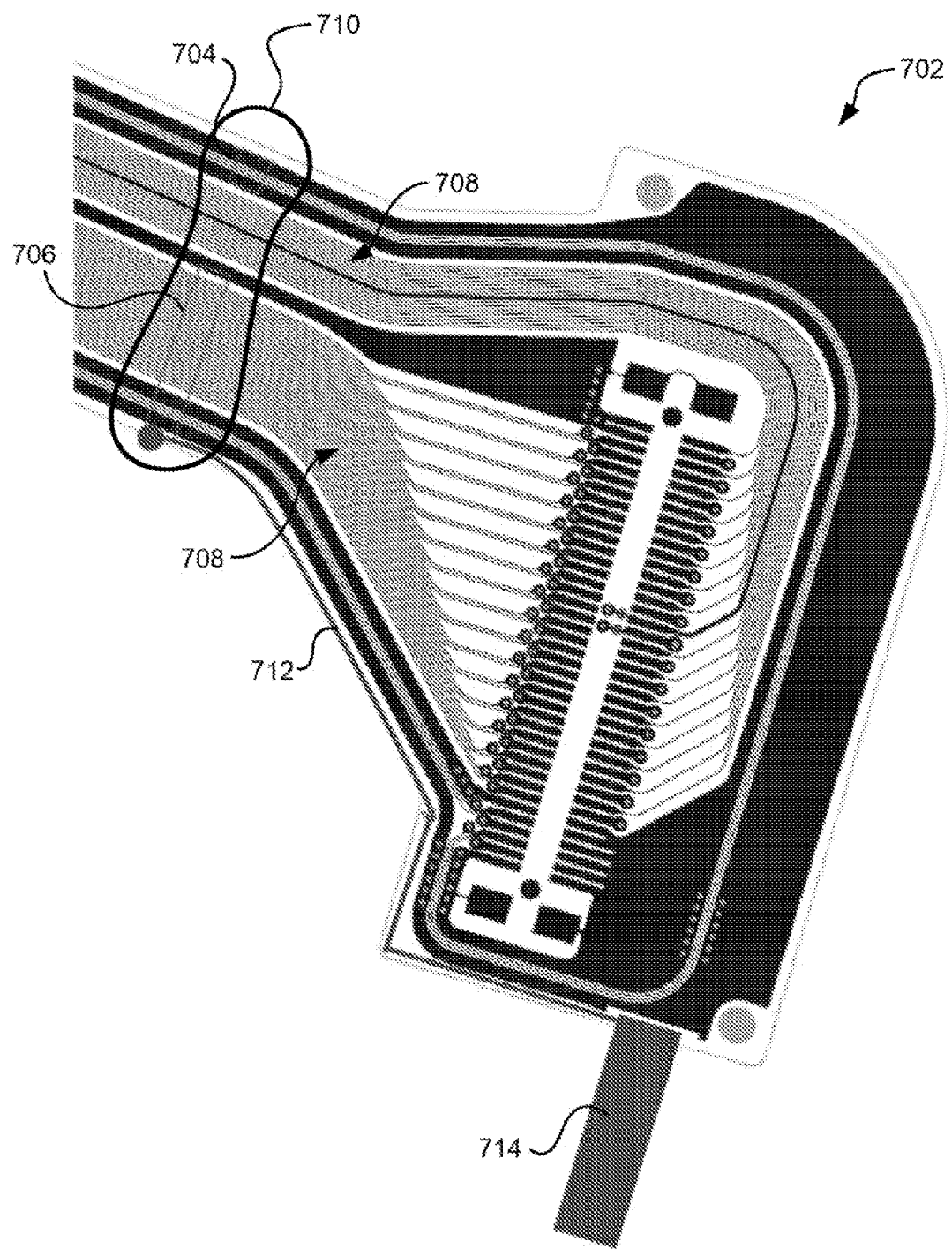
FIG. 7A illustrates a cable, according to one embodiment.
Figure 7B:
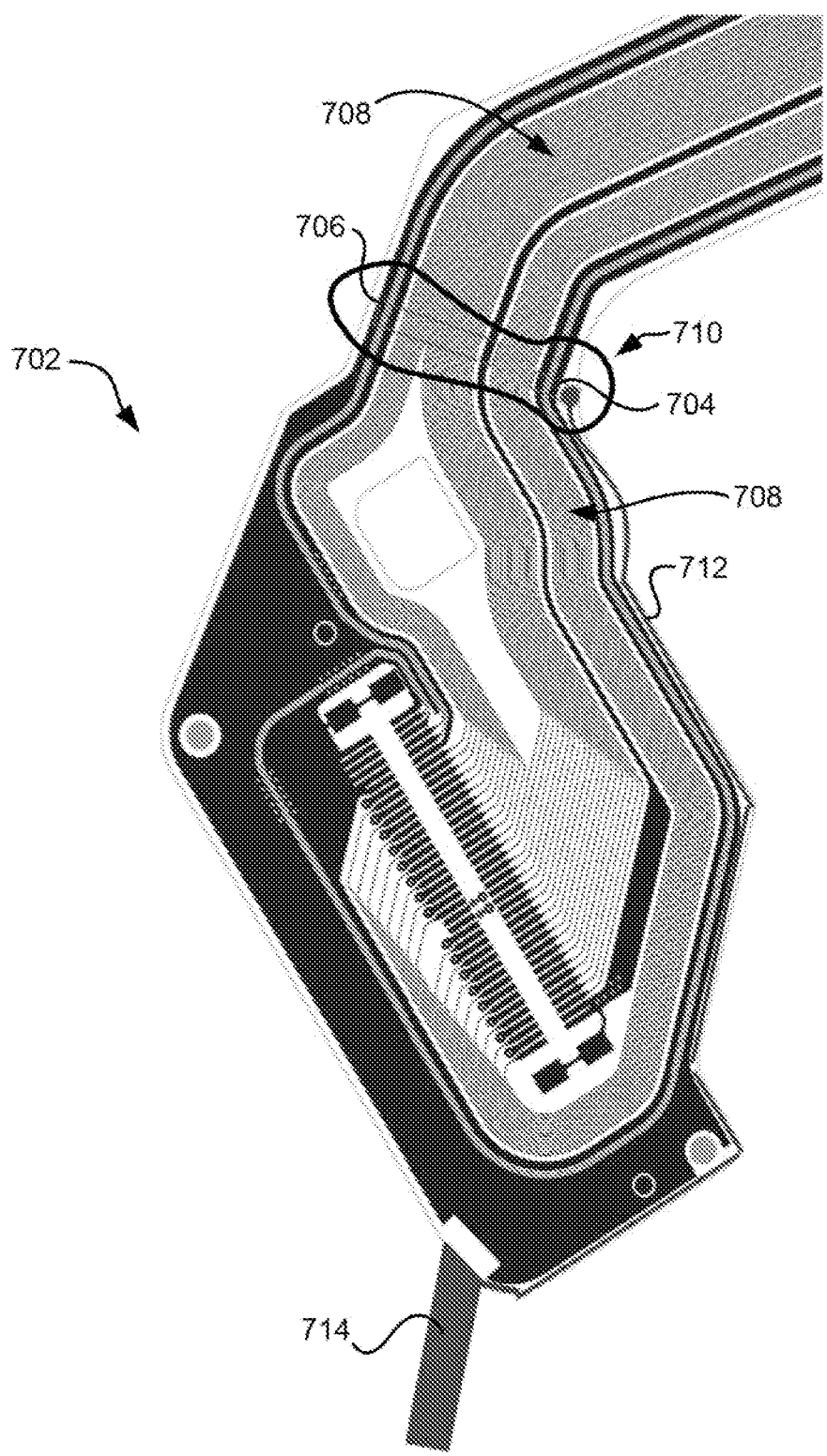
FIG. 7B illustrates a cable, according to one embodiment.

With reference to FIGS. 7A-7B, two cables 702 are shown according to various embodiments. These cables 702 include one or more windows 704, 706, for accessing leads 708 to one or more of the servos, readers, ground traces, etc. The windows 704, 706 in the cable 702, which expose the leads 708, are available for applying an ESD adhesive 710 across, thereby covering the leads 708 and providing ESD protection to the sensitive elements during manufacturing and use, in one approach. This application of the ESD adhesive 710 may be in addition to or instead of an application across the solder pad, as illustrated in FIGS. 3-5, according to various embodiments.

Figure 7C:
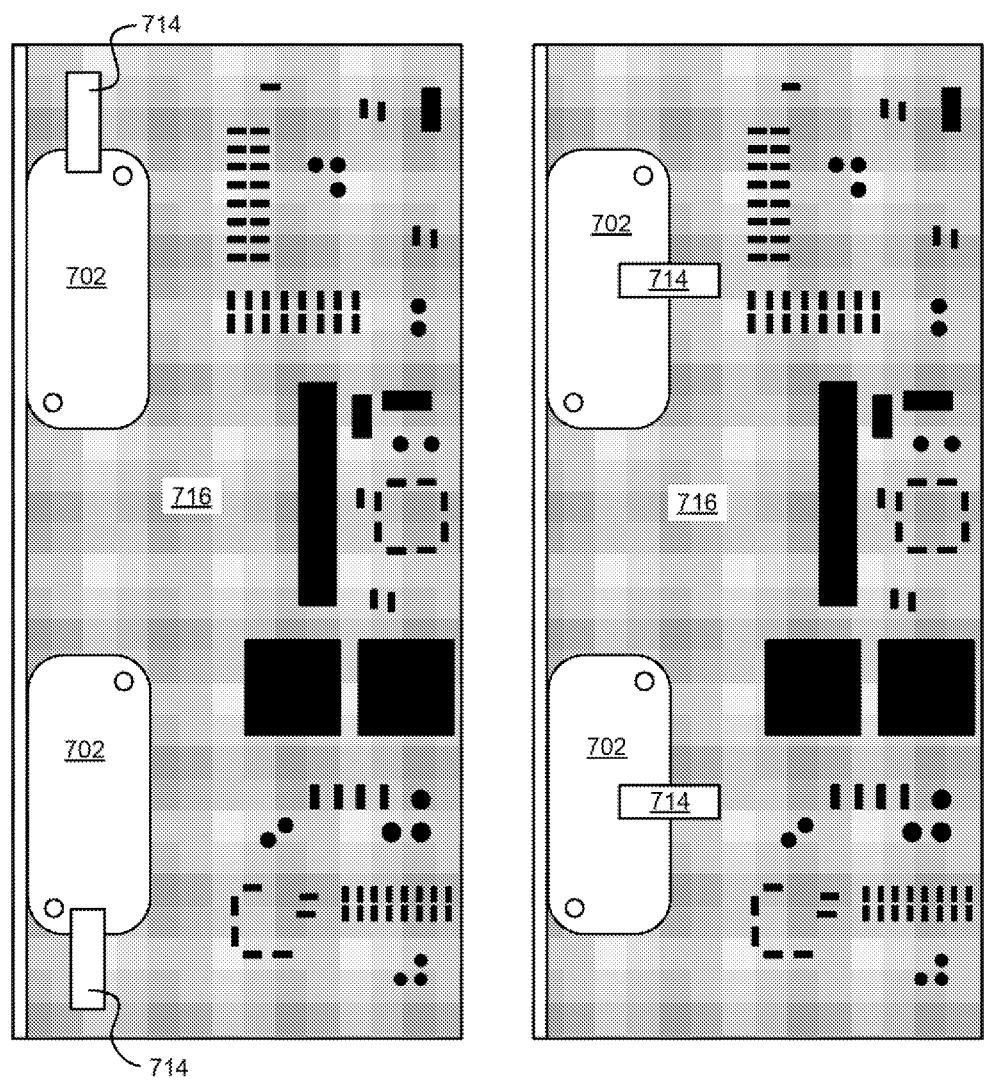
FIG. 7C illustrates a cable interfacing with a circuit board, according to one embodiment.

In one approach, a DA grounding lead 712 is provided with the cable 702, and this lead 712 may also be exposed by a window 704, 706 and may be coupled to a tab 714 for grounding the ESD adhesive 710 once it is applied, thereby grounding elements of an electronic device. This may be accomplished by coupling the tab 714 to a ground on a circuit board 716, as shown in FIG. 7C. There are various positions available for placement of the tab 714, and a few of those are shown in FIG. 7C. Of course, the actual configuration and layout of the cable 702 and the circuit board 716 may dictate which placement is preferred over another, according to some approaches.

In some approaches, the cable 702 may include a grounding lead 712 coupled to a ground of the electronic device for grounding the at least one element of the electronic device through the ESD adhesive 710. In further approaches, the grounding lead 712 may be an integral part of the cable 702 located at least partially beneath a sheath covering the cable 702. For example, the grounding lead 712 may run beneath a cable sheathing until it reaches an end of the cable 702 at which point it may be exposed, thereby allowing the grounding lead 712 to be grounded.

Figure 8:
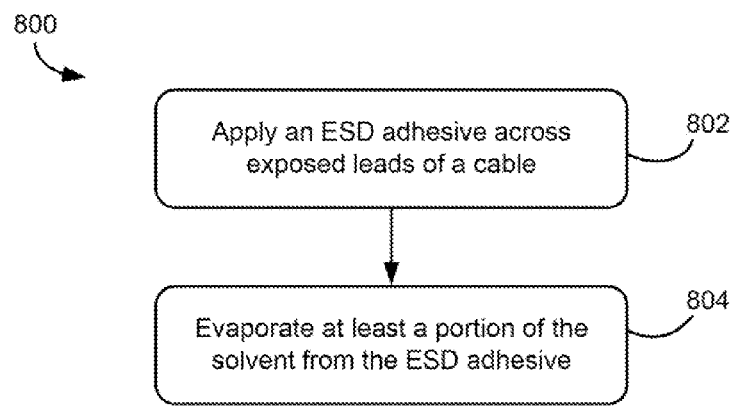
FIG. 8 illustrates a method for providing ESD protection to an element of an electronic device, according to one embodiment.

Now referring to FIG. 8, a method 800 for providing ESD protection to an element of an electronic device, such as reader and/or writer transducers in a magnetic head, is shown, according to one embodiment. The method 800, in some approaches, may be performed in any desired environment, and may include embodiments and/or approaches described in relation to FIGS. 1-7C. Of course, more or less operations than those shown in FIG. 8 may be performed as would be known to one of skill in the art.

In operation 802, an ESD adhesive is applied across exposed leads of a cable. The ESD adhesive, according to one embodiment, includes a polymeric thin film, electrically conductive fillers dispersed in the polymeric thin film, and a solvent for controlling a viscosity of the ESD adhesive.

In operation 804, at least a portion of the solvent is evaporated from the ESD adhesive. The solvent enables the ESD adhesive to form around the exposed leads of the cable. In one approach, at least some of the leads may be coupled to an element of an electronic device. After the ESD adhesive has formed around the leads, the solvent may be evaporated out so that the ESD adhesive obtains a structure similar to a gooey rubber substance, in one approach.

According to one embodiment, the ESD adhesive may be applied via an application method selected from the group consisting of: syringing, silk screening, painting, and spraying. Of course, any other application method known in the art may be used also.

In one approach, the solvent may be xylene, the polymeric thin film may be a polyurethane, and the electrically conductive fillers may be carbon black. Of course, any other combination of components may be used, as described previously.

In another approach, the ESD adhesive may have a viscosity in a range from about 10 CP to about 2000 CP prior to evaporation of the solvent therefrom, and more preferably in a range from about 30 CP to about 250 CP prior to evaporation of the solvent therefrom, enabling the ESD adhesive to flow around a surface area of the exposed leads of the cable in a coverage area. The coverage area is a portion of the exposed leads where the ESD adhesive is applied. Preferably, the coverage area will be as close to 100% as possible. However, in some other embodiments, and as dictated by the particular application in which the ESD adhesive is being used, the coverage area may be greater than about 95%, greater than about 90%, greater than about 80%, etc.

In another embodiment, the ESD adhesive may have a lead-to-lead resistance in a range from about 50 k$\Omega$ to about 10 M$\Omega$, about 20 k$\Omega$ to about 100 M$\Omega$, or any other range therebetween or as suited to the particular application for which the ESD adhesive is being used.

Some of the advantages of this invention are as follows: (1) it protects MR sensors from ESD damage; (2) materials used to prepare the ESD adhesive are inexpensive, resulting in an inexpensive ESD protection solution; (3) the method for applying the ESD adhesive is simple and uses techniques similar to methods for applying adhesives in other areas of manufacturing; (4) it provides MR sensor protection immediately once applied, which allows for the adhesive to be applied before the magnetic head is attached to the cable, providing protection through the entire assembly process; (5) no out gassing of volatile materials occurs in the application of the ESD adhesive; (6) the materials used in the ESD adhesive cause no physical change to the materials used in the cable or the connector assembly; (7) the ESD adhesive has a long shelf life, in contrast to epoxies and room temperature vulcanizing (RTV) silicones, which epoxies are commonly used for attaching the cable to the magnetic head, which have a limited shelf life; (8) the low viscosity of the ESD adhesive allows for increased surface contact with read and/or write transducer leads, thereby providing better protection than more viscous materials; (9) if the viscosity of the ESD adhesive changes, it may be returned to original state with the addition of a common solvent; (10) the low viscosity of the ESD adhesive results in desired resistivities not achievable via other materials; (11) the choice of a polymeric material thinned by a solvent results in superior flow properties while also providing a desired resistivity.

It will be clear that the various features of the foregoing methodologies may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a cable comprising a plurality of leads; and
an electrostatic discharge (ESD) adhesive coupled to the plurality of leads in a coverage area for providing ESD protection to at least one element of an electronic device; and
a multi-diode chip coupled to the plurality of leads,
wherein the ESD adhesive comprises a mixture of a polymeric thin film and electrically conductive fillers dispersed in the polymeric thin film,
wherein the ESD adhesive has a resistivity in a range from about 50 k$\Omega$ to about 100 M$\Omega$,
wherein the coverage area is a portion of the plurality of leads where the adhesive is applied, and
wherein the cable further comprises a grounding lead coupled to a ground of the electronic device for grounding the at least one element of the electronic device through the ESD adhesive.

2. The system as recited in claim 1, wherein the multi-diode chip comprises:
a plurality of crossed diode sets, each crossed-diode set operatively coupled across pairs of contact pads,
wherein a first contact pad of each pair of contact pads is coupled to a cable lead and a second contact pad of each pair of contact pads is coupled to an element of the electronic device.

3. The system as recited in claim 1, wherein the at least one element of the electronic device is a read transducer of a magnetic head.

4. The system as recited in claim 1, wherein the ESD adhesive couples to the plurality of leads through at least one window in a covering of the cable, the at least one window being positioned between ends of the cable.

5. The system as recited in claim 1, wherein the grounding lead is an integral part of the cable at least partially located beneath a sheath covering the cable.

6. The system as recited in claim 1, wherein the polymeric thin film is a polyurethane compound and the electrically conductive fillers are carbon black.

7. A system, comprising:
a cable comprising a plurality of leads; and
an electrostatic discharge (ESD) adhesive operatively coupled to the plurality of leads for providing ESD protection to at least one element of an electronic device, the ESD adhesive comprising a mixture of a polymeric thin film and electrically conductive fillers dispersed in the polymeric thin film,
wherein the ESD adhesive has a structural characteristic of being formed through at least partial evaporation of a solvent therefrom,
wherein the ESD adhesive has a viscosity in a range from about 10 CP to about 2000 CP prior to evaporation of the solvent therefrom, enabling the ESD adhesive to flow around a surface area of the plurality of leads in a coverage area, wherein the coverage area is a portion of the plurality of leads where the ESD adhesive is applied.

8. The system as recited in claim 7, further comprising a multi-diode chip coupled to the plurality of leads, the multi-diode chip comprising:
   a plurality of crossed diode sets, each crossed-diode set operatively coupled across pairs of contact pads,
   wherein a first contact pad of each pair of contact pads is coupled to a cable lead and a second contact pad of each pair of contact pads is coupled to an element of the electronic device.

9. The system as recited in claim 7, wherein the at least one element of the electronic device is a read transducer of a magnetic head.

10. The system as recited in claim 7, wherein the ESD adhesive couples to the plurality of leads through at least one window in a covering of the cable, the at least one window being positioned between ends of the cable.

11. The system as recited in claim 7, wherein the cable further comprises a grounding lead coupled to a ground of the electronic device for grounding the ESD adhesive.

12. The system as recited in claim 7, wherein the solvent is xylene, the polymeric thin film is a polyurethane compound, and the electrically conductive fillers are carbon black.

13. The system as recited in claim 7, wherein the ESD adhesive has a resistivity in a range from about 50 k$\Omega$ to about 100 M$\Omega$.

14. A method for providing electrostatic discharge (ESD) protection to an element of an electronic device, the method comprising:
   applying an ESD adhesive across exposed leads of a cable, the ESD adhesive comprising:
      a polymeric thin film;
      electrically conductive fillers dispersed in the polymeric thin film; and
      a solvent for controlling a viscosity of the ESD adhesive; and
   evaporating at least a portion of the solvent from the ESD adhesive,
   wherein at least some of the leads are coupled to an element of an electronic device.

15. The method as recited in claim 14, wherein the solvent is xylene, the polymeric thin film is a polyurethane compound, and the electrically conductive fillers are carbon black.

16. The method as recited in claim 14, wherein the ESD adhesive has a viscosity in a range from about 10 CP to about 2000 CP prior to evaporation of the solvent therefrom, enabling the ESD adhesive to flow around a surface area of the exposed leads of the cable in a coverage area, wherein the coverage area is a portion of the exposed leads where the ESD adhesive is applied.

17. The method as recited in claim 4, wherein the ESD adhesive is applied via an application method selected from the group consisting of:
   syringing, silk screening, painting, and spraying.

18. An electrostatic discharge (ESD) adhesive, comprising:
   a polymeric thin film;
   electrically conductive fillers dispersed in the polymeric thin film; and
   a solvent for controlling viscosity of the ESD adhesive,
   wherein the ESD adhesive has a resistivity in a range from about 50 k$\Omega$ to about 10 M$\Omega$ after evaporation of the solvent therefrom,
   wherein the ESD adhesive has a structural characteristic of being formed through at least partial evaporation of the solvent therefrom, and
   wherein the ESD adhesive has a viscosity in a range of from about 30 CP to about 250 CP prior to evaporation of the solvent therefrom.

* * * * *